June 24, 1930.  W. E. McKIM  1,765,495
WEIGHING APPARATUS
Filed June 16, 1927  4 Sheets-Sheet 1

INVENTOR
Wilmer E. McKim
By Archworth Martin,
Attorney

June 24, 1930.  W. E. McKIM  1,765,495
WEIGHING APPARATUS
Filed June 16, 1927    4 Sheets-Sheet 2
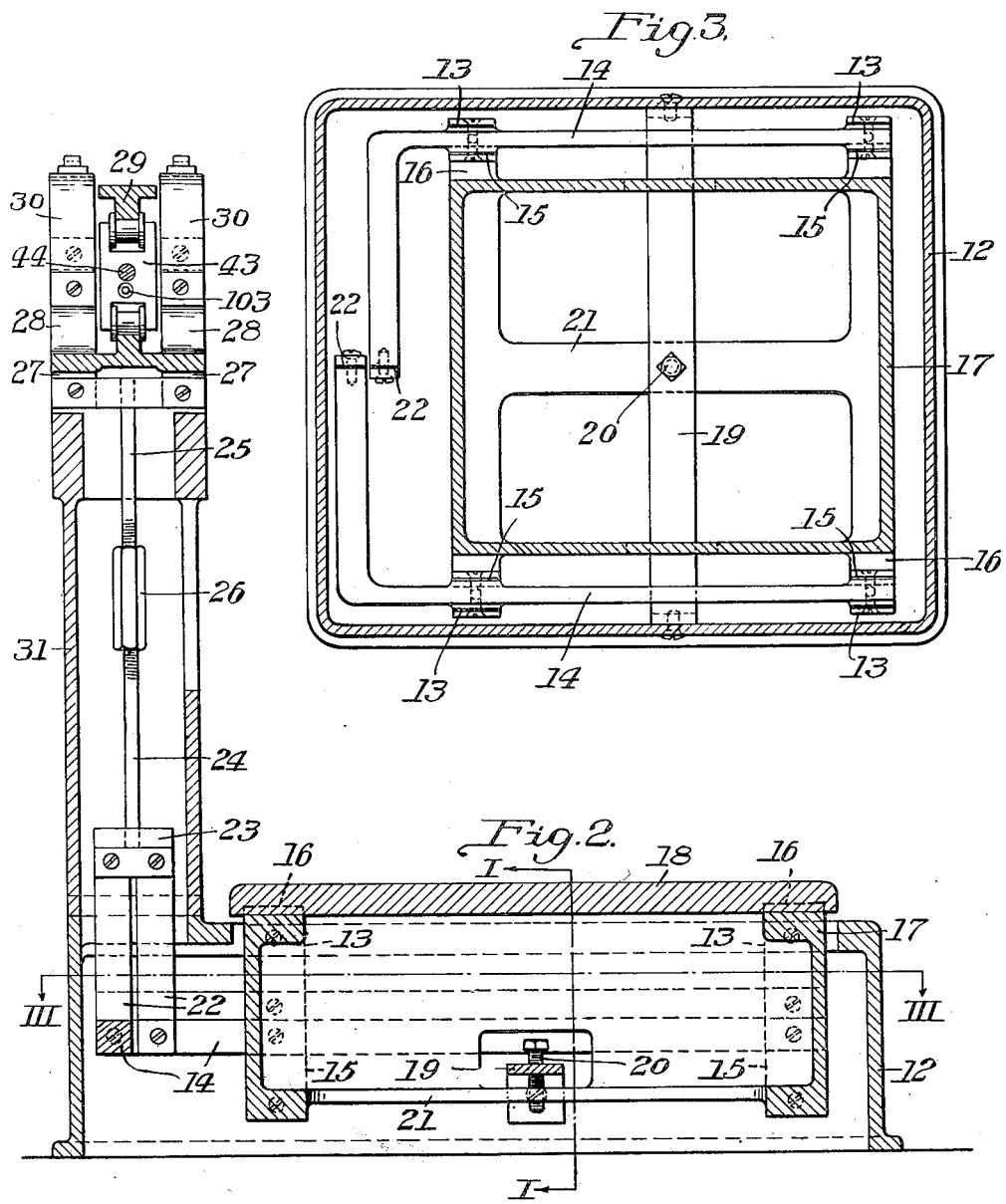
INVENTOR
Wilmer E. McKim
By Archworth Martin,
Attorney.

June 24, 1930.   W. E. McKIM   1,765,495
WEIGHING APPARATUS
Filed June 16, 1927   4 Sheets-Sheet 3

INVENTOR
Wilmer E. McKim
By Archworth Martin,
Attorney

June 24, 1930. W. E. McKIM 1,765,495
WEIGHING APPARATUS.
Filed June 16, 1927 4 Sheets-Sheet 4
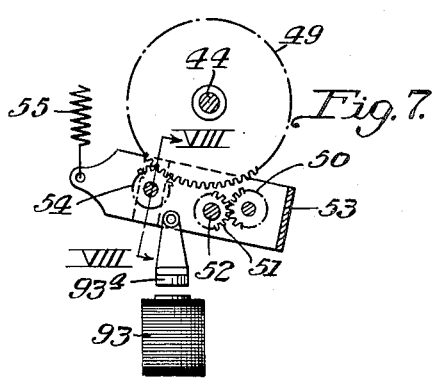
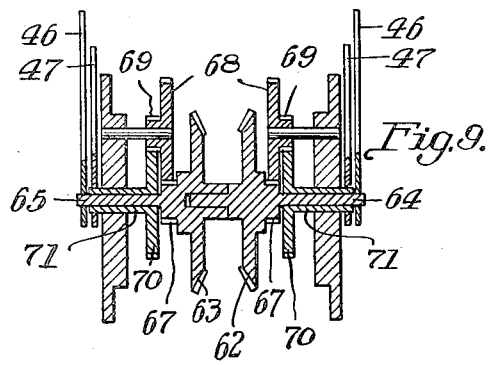
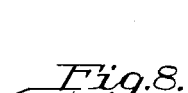
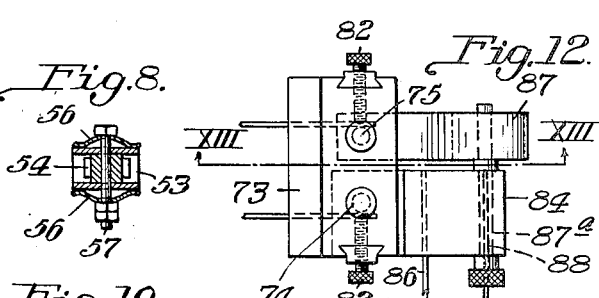
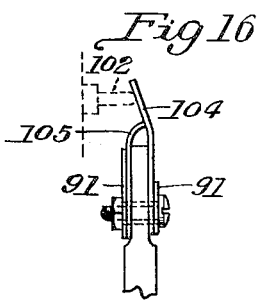
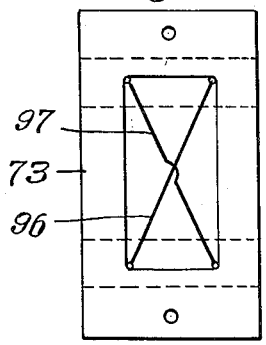
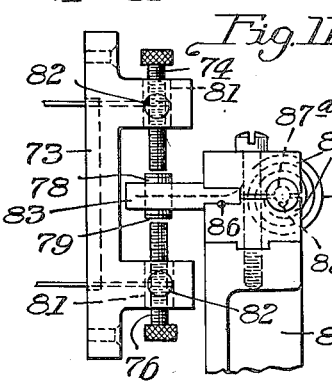
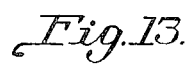
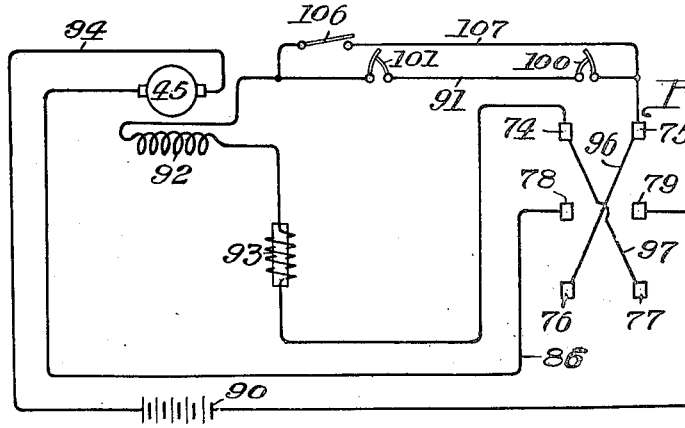
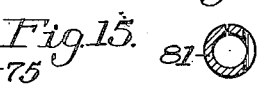
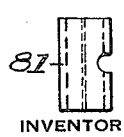
INVENTOR
Wilmer E. McKim
By Archworth Martin,
Attorney Patented June 24, 1930

1,765,495

UNITED STATES PATENT OFFICE

WILMER E. McKIM, OF NEW KENSINGTON, PENNSYLVANIA, ASSIGNOR TO WALTER E. SPILL, TRUSTEE, OF PITTSBURGH, PENNSYLVANIA

WEIGHING APPARATUS

Application filed June 16, 1927. Serial No. 199,237.

My invention relates to weighing apparatus, such as scales, and particularly to those of the type capable of indicating weights with great exactness, as in the case of those for laboratory use, for example.

My invention has for one of its objects the provision of scale apparatus wherein there is little or no tendency for the parts to become so worn or disarranged through use as to impair the accuracy thereof.

Another object of my invention is to provide weighing apparatus wherein there are no losses through friction of the moving parts of the scale.

A further object of my invention is to provide a scale having a poise and indicating mechanism that are automatically operable to indicate weights, and which are automatically returned to neutral or balanced positions when the weight is removed.

Another object of my invention is to provide an improved arrangement of operating mechanism for the poise and indicator of a scale.

Still another object of my invention is to simplify and improve generally the structure and operation of scale mechanisms.

Figure 1:
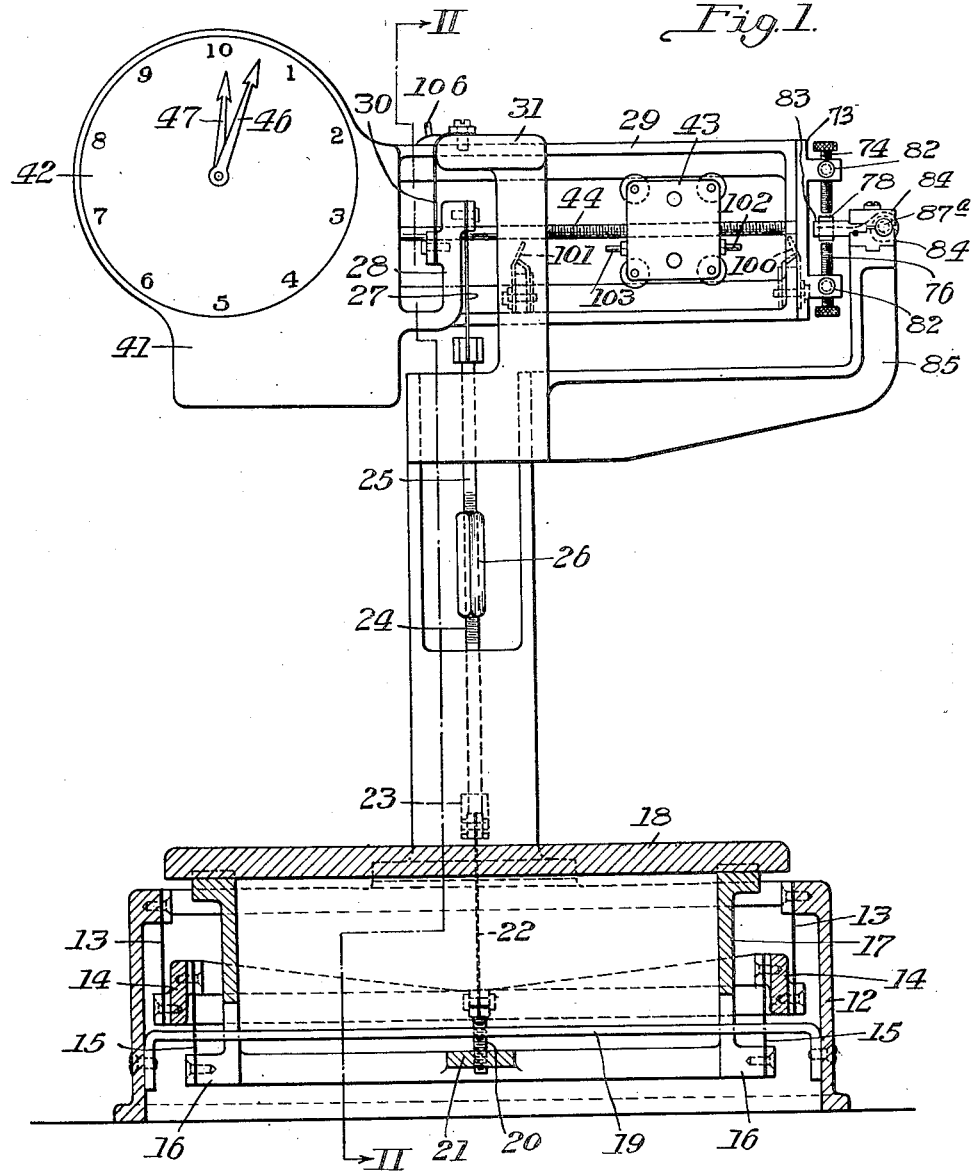
Figure 4:
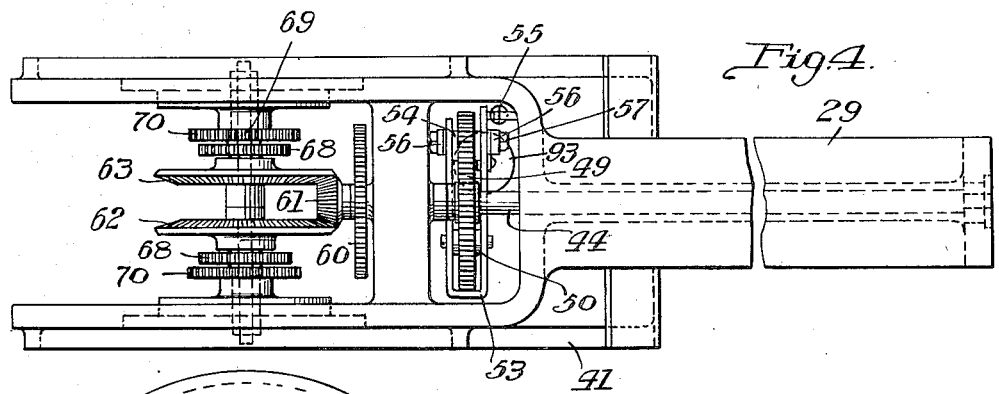
Figure 5:
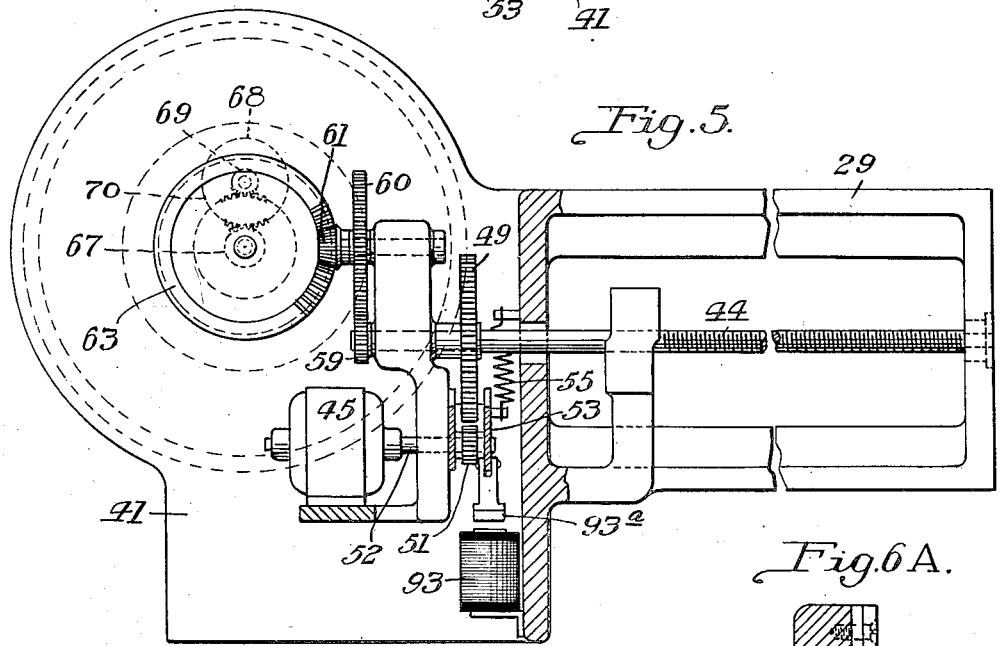
Figures 6, 6A:
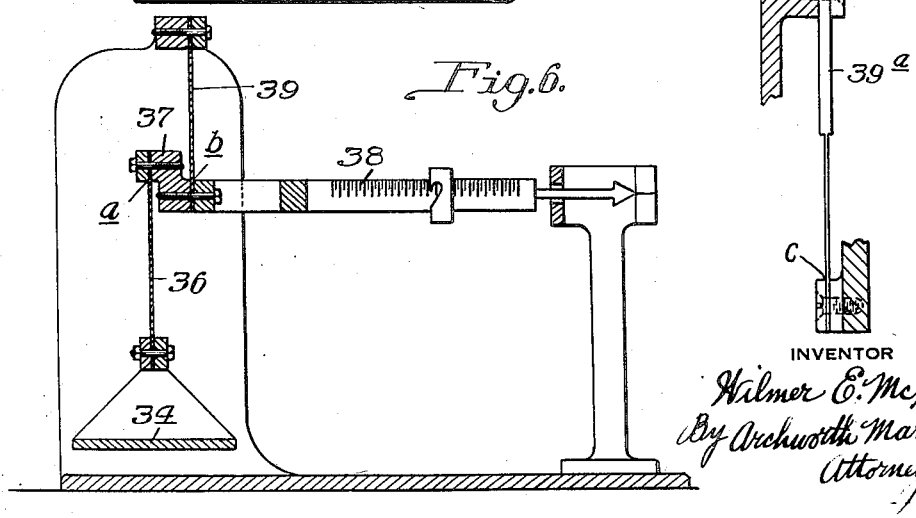

One form which my invention may take is shown in the accompanying drawing, wherein Figure 1 is a view partially in side elevation and partially in section of a scale equipped with my invention, the lower portion thereof being taken on the line I—I of Fig. 2; Fig. 2 is a view taken on the line II—II of Fig. 1; Fig. 3 is a view taken on the line III—III of Fig. 2; Fig. 4 is a sectional plan view of a portion of the apparatus of Fig. 1; Fig. 5 is a view similar to Fig. 1, but on an enlarged scale, and showing a portion of the apparatus in section; Fig. 6 is an elevational sectional view of a modified form of scale, of simpler form than that shown in the other figures; Fig. 6ª shows a modification, on an enlarged scale, of a portion of the apparatus of Fig. 6; Fig. 7 is a view showing certain of the operating parts of Figs. 1, 4 and 5; Fig. 8 is a sectional view of a portion of the apparatus of Fig. 7; Fig. 9 is a sectional view of a portion of the operating mechanism of Figs. 4 and 5; Fig. 10 is a rear elevational view of the contact carrying block of Fig. 1; Fig. 11 is a side elevational view thereof, showing its relation to the stationary contact members; Fig. 12 is a plan view of the structure of the apparatus of Fig. 11; Fig. 13 is an elevational sectional view of the apparatus of Fig. 12; Fig. 14 shows one of the terminal bushings of Figs. 10 and 12 in sectional plan and elevation; Fig. 15 is a view showing the wiring diagram of the electrical system for operating the poise and the indicator hands, and Fig. 16 is a view of two of the switches shown in Figs. 1 and 15.

Referring more particularly to Figs. 1 to 3, I show a scale base 12 that is in the form of a casing or housing. The base 12 is provided with an inturned flange from which are suspended four flexible strips 13 of metal such as phosphor bronze, the upper ends of these strips being secured to the base by means of clamping plates and screws, as shown more clearly in Fig. 1. A rocker bar 14 of Z form in cross section is connected to each pair of suspending strips 13 and these bars in turn support strips 15 to whose lower ends are connected extensions 16 of a rack 17 that supports a scale platform 18. The upper edge of the rack extends into grooves formed upon the underside of the scale platform 18, to hold such platform against sliding out of position. A flexible anchoring member 19 is secured at its ends to the base 12 and at its intermediate portion is connected through a screw 20, with a cross rod 21 of the rack 17, to prevent excessive swinging of the platform-supporting members. The forward end of each of the rocker bars 14 is connected to one of a pair of flexible strips 22 whose upper ends are secured in a clamp 23 that is in turn connected to a rod 24. The rod 24 is connected to a rod 25 through a turn buckle 26, longitudinal adjustment of the rods 24 and 25 being effected by the turn buckle in the usual manner. The rod 25 is connected to a pair of flexible strips 27 that are in turn connected to a bracket-like extension 28 of a scale beam 29. The scale beam 29 is flexibly supported by a pair of strips 30 that are connected to the bracket 28 and to the upper end of a standard or post 31 that is secured to or formed integrally with the scale base 12.

It will be seen that when weight is imposed upon the scale platform 18, the weight is transmitted to the flexible strips 13 and 15 and the rocker arms 14, and that such arms tend to rotate, by reason of the fact that the weight is imposed upon said arms at a point on one side thereof and that said arms are supported from the scale base at a point horizontally offset from the first-named point, as will be apparent from an inspection of Fig. 1. The inturned ends of said arms, as shown in Figs. 2 and 3, move down, drawing the strips 22 and 27, and their intermediate connecting members downwardly, so as to swing the scale beam 29 upon its supporting strips 30.

The bars 14 and bracket 28 are connected to their associated strips in such manner that the principle of operation is as shown more clearly in Fig. 6. This figure illustrates the basic feature of the invention in a more simple form, in that it discloses a scale structure wherein the movement of the weighted scale platform 34 is imparted through a flexible strip 36 and a rocker arm 37 that is of Z form in cross section, to a scale beam 38, the parts being suspended by a flexible strip or sheet 39. The points of greatest flexure of the strips 36 and 39 are indicated at $a$ and $b$ respectively, and it will be noted that these points $a$ and $b$ are in the same horizontal plane. With the points $a$ and $b$ in horizontal alinement, a maximum deflection of the scale beam takes place upon a given movement of the scale pan, and if the point $a$ be shifted to a lower plane than the point $b$, the amount of deflection of the scale beam in a given condition, would decrease, until the point has reached a position in vertical alinement with the point $b$ at which position there would be no deflection whatever of the scale beam. Greater accuracy is therefore secured by having the point $a$ disposed in approximately horizontal alinement with the point $b$.

By the arrangement above described, the use of pivots, including the well-known knife edge supports, is avoided, and the inaccuracies resulting from the frictional resistance to movement of these older types of devices are eliminated by my arrangement. The suspension of the weight-transmitting members upon flexible strips, which may be of .003 inch thickness in some cases, and still thinner or thicker in other cases, eliminates frictional resistance and consequently a greater accuracy in results is secured. Furthermore, the points, $a$ and $b$, of greatest flexure of the strips 36 and 39 respectively, are always at the mid planes of these strips and the radius of movement can be measured with exactness, and will always remain constant, since there is no wear as in the case of knife edge and similar pivot bearings. In other words, the distance between the centers, $a$ and $b$, can be measured and there will be no deviation from such measurement through use of the apparatus.

With knife-edge scales it is extremely difficult to make the bearing centers to accord with the designed dimensions, as knife edges cannot be used when they are razor sharp, but must be rounded somewhat, depending upon the load to be carried, and their centers are, therefore, difficult to locate.

In the testing machines in use at the plant of a large spring manufacturing concern, which were made by two of the largest testing machine makers in this country, I have frequently found the short bearing centers vary from the specified dimensions as much as three thirty-seconds of an inch. In small machines, of course, this variation is much less, but it is notoriously large in all knife-edge machines. With the Z-bar strip suspension type, it is a very easy matter to make the suspension centers to accord to the designed dimensions with tolerances of only one thousandth, or even one ten-thousandth of an inch. This is made so by the ease with which parallel surfaces can be measured, and contrasts with the great natural difficulty in measuring from center to center of the rounded knife edges.

Knife edges wear rapidly and, on account of the difficulty of making any single pair line up perfectly, they are prone to bind, thus destroying their sensitivity. With suspension strips there is no tendency whatever to bind and there is nothing to wear. Suspension strips are extremely cheap and replacement is an insignificant factor in maintaining the scales in service.

Suspension-strip scales are easily made to be very accurate and sensitive—the latter feature being obtained by the bending in the strips, caused by the load, being removed in the operation of balancing. This results in a scale balance that is well nigh perfect.

In Fig. 6$^a$, I show a strip 39$^a$ of modified form, but on a somewhat enlarged scale. The making of thin flexible strips, particularly in thicknesses of .003 inch is quite an expensive process and very difficult. I find that considerable expense will be saved if the strips are rolled to a somewhat greater thickness than desired in their finished form and thereafter grinding away both sides of the strip adjacent to their point of greatest flexure $c$, by grinding wheels of suitable form. By this means, I am able to make the flexing portions of the strips sufficiently thin to have a maximum of sensitivity, and much thinner than it would be possible to roll them.

It will be understood that practically all of the flexing occurs adjacent to the point $c$ and that the grinding operation need not be carried longitudinally of the strip to the extent shown in Fig. 6$^a$.

Referring now to Figs. 1, 4 and 5, it will be seen that the beam 29, at its left hand end is in the form of a housing 41 on each of whose sides a dial 42 is provided. The housing serves to enclose driving mechanism for the indicating apparatus and for the poise which will be hereinafter described. The poise 43 is mounted to travel on suitable track ways on the beam 29 and has screw-threaded engagement with a screw shaft 44 that is operated by a motor 45 to restore the poise to neutral position where the beam 29 is in a state of balance. When weight is imposed upon the scale platform 18, the beam will be rocked on its support 30 in a clockwise direction, closing the circuit of the motor 45, through connections to be hereinafter described, to thereby set such motor in operation and cause it to move the poise into position to balance the beam. The motor in moving the poise 43 also effects movement of the indicator hands 46 and 47, so that the extent of movement of the poise and therefore the amount of weight upon the platform 18 will be visually indicated.

A gear wheel 49 is secured to the screw shaft 44 and is driven from the motor 45 through an intermediate gear 50 and a motor pinion 51 that is secured to the motor shaft 52. The intermediate gear 50 is journaled in a gear case 53 that is pivotally supported upon the motor shaft 52. When the gear case 53 is moved in a counter-clockwise direction, from the position shown in Fig. 7, the gear wheel 50 will be brought into mesh with the gear wheel 49 to effect driving connection between the screw shaft 44 and the motor. A gear wheel 54 is journaled in the upper end of the case 53 and meshes with the gear wheel 49 when the parts are in the position shown in Fig. 7, a spring 55 being provided to normally hold the parts in such position. This position is known as the braking position, since the gear wheel 54 is frictionally held against rotative movement by means of spring plates 56 and a bolt 57 that extend through the upper portion of the cage 53. The sides of the case 53 are flexible, so that they can be yieldably held in engagement with the sides of the gear wheel 54 to thus permit the screw shaft 44 to be held against rotative movement, or to be quickly stopped when the spring 55 is permitted to return the gear wheel 54 to the position shown in Fig. 7.

A pinion 59 is provided upon the left hand end of the screw shaft 44, and meshes with a gear wheel 60 that is mounted on a shaft that also carries a bevel pinion 61. The pinion 61 meshes with a pair of bevel gear wheels 62 and 63. The gear wheels 62 and 63 are secured to shafts or have shaft-like extensions 64 and 65, respectively, which project through the dials 42 and have the indicator hands 46 secured thereto. The inner ends of the hub-like extensions of the gear wheels 62 and 63 have bearing engagement with one another (Fig. 9), so as to maintain the same in axial alinement. A gear wheel 67 is secured to each of the shafts 64 and 65 and meshes with a gear wheel 68 which is mounted on a shaft that carries a pinion 69. The pinions 69 each mesh with a gear wheel 70 that is secured to a sleeve 71 to the outer end of which the small indicator hands 47 are secured. The gear reduction is such that the large hands 46 will make a complete revolution each time that the small hands 47 move one-tenth of the distance around the dial 42.

The outer end of the beam 29 has secured thereto a contact-carrying plate 73 that is shown more clearly in Figs. 10, 11 and 12. The upper portion of the member 73 carries a pair of screw-like terminals 74 and 75 and a lower pair of terminals 76 and 77 that are vertically adjustable to effect engagement with intermediate stationary contacts 78 and 79 at desired positions of the beam 29. The member 73 is preferably of insulating material and contains recesses for the reception of cylindrical-like contact bushings 81 for each of the terminal screws 74, 75, 76 and 77, with which bushings the screws have screw-threaded engagement. The bushings are cut away at their sides as indicated at Fig. 14, so that the ends of conductors may lie in such cut out portions, and, through the bushings, have electrical connection with the terminal screws. The bushings are held against displacement by means of screws 82 as shown more clearly in Fig. 12.

The stationary contact member 78 extends through and is secured to a block 83 that is clamped between blocks 84 that are mounted on an extension 85 of the column 31, the blocks 85 being of insulating material. The block 83 serves as a conductor and a conductor wire 86 is held in engagement therewith by the clamping blocks 84. The terminal 79 is carried by the end of a spring-like conductor 87 that is secured to a bolt 87ª which lies between the clamping blocks 84, the bolt 87ª being a conductor and having contact with a wire 88.

While I herein designate the terminals 78 and 79 as the fixed contact members, because they are connected to a fixed portion (column 31) of the scale, the contact member 79 is yieldably mounted, so that a positive and easy closing of the circuits is effected when either the contacts 74 and 75 or the contacts 76 and 77 are brought into circuit-closing position through tilting of the beam 29, the contact 79 being so positioned that it will be engaged by the contact 75 or the contact 77, when the beam approaches circuit-closing position.

When the beam 29 is in balanced position, the circuit through the motor 45 is broken, as will appear from the diagram of Fig. 15. If, now, weight be imposed upon the platform 18, the beam 29 will be swung in a clockwise direction, bringing the contact members 74 and 75 into engagement with the stationary contact members 78 and 79, thus closing the circuit of the battery or other source of power 90, through conductor 88; terminals 79—75, conductor 91; field coil 92; solenoid 93; terminals 74—78; conductor 86; the armature of the motor 45 and the conductor 94, to the other side of the battery 90. The energization of the solenoid 93 (Figs. 7 and 15) causes it to attract the magnet 93ª and rock the gear case 53 against the tension of the spring 55, to bring the gear wheel 50 into mesh with the gear wheel 49. The closing of the circuit also energizes the motor, which thereupon drives the screw shaft 44 to move the poise 43 to such position that the beam 29 will be balanced, thereby moving the contact members 74 and 75 out of engagement with the contact members 78 and 79 and breaking the circuit through the motor and the solenoid. The hands 46 and 47 of the dials 42 have meantime been moved, through the connections heretofore described, and will indicate the distance through which it was necessary to move the poise 43 in order to cause it to balance the weight imposed upon the platform 18, and therefore the hands will indicate the amount of such weight. Immediately upon breaking the circuit, the solenoid releases the magnet 93ª that is connected to the case 43, thus permitting the braking gear wheel 54 to be moved by the spring 55 into mesh with the gear wheel 49 and prevent further movement of the poise and the indicator hands.

When the weight is removed from the platform 18, the poise 43 will again be out of balance, so that the beam 29 will swing in a counter-clockwise direction and bring the contact members 76 and 77 into engagement with the undersides of the stationary contact members 78 and 79. The contact member 76 has connection, through a conductor 96, with the contact member 75, and the contact members 74 and 77 are bridged by a conductor 97, so that the circuit through the field coils 92 will be reversed, to thereby reverse the direction of rotation of the motor 45 and cause the poise 43 to be restored to its original balanced position with the scale platform 18 empty. In this latter arrangement, the circuit is as follows: From battery 90 through conductor 88; terminals 79 and 77; conductor 97; terminal 74; solenoid 93; field coils 92; conductor 91; terminal 75; conductor 96; terminals 76 and 78; conductor 86; motor 45, and conductor 94, to the other side of the battery. In this instance, as when the load was imposed upon the scale platform 18 to move the beam 29 down, the solenoid 93 is energized to move the intermediate gear wheel 50 into driving engagement with the gear wheel 49, so that the screw shaft 44 will be driven in the reverse direction, to restore the poise 43 to neutral position. When the poise 43 reaches neutral position, the contact members assume the position shown in Fig. 15, with all circuits broken, the solenoid being at that stage again de-energized, to permit the frictionally-held gear wheel 54 to move to braking position.

In case the beam 29 by reason of an obstruction or otherwise, should be prevented from being moved to balanced position by the poise 43, and the motor 45 thereafter permitted to operate, I provide switches 100 and 101 adjacent to each end of the path of travel of the poise 43, in position to be engaged by stops 102 and 103, respectively, that are carried on the poise when the poise overtravels the normal extremities of its path. These switches are shown as connected in the line of conductor 91 and may have the form shown in Fig. 16. A contact member 104 is connected to one end of the conductor 91 and the other contact member 105 of the switch is connected to another end thereof, so that when the member 104 is pushed out of engagement with the contact member 105, the circuit is broken and the motor is thereupon de-energized, thus avoiding injury to the same through overload arising by the poise 43 arriving at the end of its path of travel.

Assuming the circuit to have been broken, through opening of one of the switches 100 or 101, the operator will remove the obstruction which prevented the tilting of the beam 29 and will thereupon restore the circuit by means of a push button switch 106 (Figs. 1 and 15). The switch 106 will close the circuit through a conductor 107 that is connected in shunt to the switches 100 and 101, thereby setting the motor in operation to restore the poise 43 to balanced position.

It will be understood that when the poise is moved to balanced position, upon imposition of a weight upon a platform 18, the hands 46 and 47 will indicate the amount of such weight and that upon removal of the weight, and restoration of the poise to neutral position, the indicator hands will also be automatically returned to neutral or zero position.

I claim as my invention:—

1. Scale apparatus comprising a depending flexible member supported at its upper end, a weight-supporting flexible member, a scale beam connected to the adjacent ends of said members, a poise mounted on said beam, a motor having driving connection with said poise, a stationary contact member in the circuit of said motor, a pair of contact members connected to said beam in position to engage the stationary contact member, and each in the motor circuit, electrical connections whereby the motor will be caused to turn in one direction when the beam is in one position and will be caused to turn in the opposite direction when the beam is in another position, and indicator mechanism having driving connection with said motor.

2. Scale apparatus comprising a scale beam, a weight-supporting member secured thereto, a poise movably mounted on the beam, a pair of scale dials, a pointer associated with each dial, and driving connections between each pointer and said poise whereby the pointers are moved in definite relation to movement of the poise.

3. Scale apparatus comprising a scale beam, a weight-supporting member secured thereto, a poise movably mounted on the beam, a dial, a pair of pointers co-operating with the said dial, driving mechanism for operating the pointers in predetermined relation, but at different speeds, and a connection for operating said mechanism in definite relation to the movement of the poise.

4. Scale apparatus comprising a beam, a poise mounted for traveling movement on the beam, a motor for driving said poise, an upper pair of electrical contact members carried by the beam, a lower pair of electrical contact members carried by the beam, an intermediate pair of contact members, one of the last-named members being yieldably mounted, and connections between a source of power, said contact members and the motor, for effecting movement of the motor in one direction, when the upper contact members are in engagement with the intermediate contact members and for effecting movement of the motor in the opposite direction, when the lower contact members are in engagement with the intermediate contact members.

5. Scale apparatus comprising a beam, a weight-supporting member connected to said beam, an upper pair of electrical contact members carried by the beam, a lower pair of electrical contact members carried by the beam, an intermediate pair of contact members, one of which is yieldably mounted and of such dimension as to be engaged by one of either the upper or lower contact members in advance of engagement by the other of such upper or lower contact members with the other intermediate contact member, a poise mounted for traveling movement on the beam, a motor for driving the poise, connections between a source of power, said contact members and the motor, for effecting movement of the motor in one direction when the upper contacting members are in engagement with the intermediate contact members and for effecting movement of the motor in the opposite direction, when the lower contact members are in engagement with the intermediate contact members.

6. Scale apparatus comprising a weight-supporting member, a balancing device, a motor for moving said device to balanced position upon imposition of weight upon said supporting member, a plurality of indicators, driving gear connection between said motor and one of the indicators for effecting movement of said indicator upon actuation of the motor, and reduction gearing connected to the other of said indicators and to the said gear connection for effecting movement of the last-named indicator in predetermined relation to the movement of the other indicator during operation of the motor.

In testimony whereof I, the said WILMER E. McKIM, have hereunto set my hand.

WILMER E. McKIM.